United States Patent
Kitagawa et al.

(10) Patent No.: US 9,154,005 B2
(45) Date of Patent: Oct. 6, 2015

(54) ROTOR CORE FOR ROTATING ELECTRICAL MACHINE, AND MANUFACTURING METHOD THEREOF

(75) Inventors: Katsuhide Kitagawa, Seto (JP); Makoto Yoshida, Takahama (JP); Masashi Matsumoto, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 220 days.

(21) Appl. No.: 13/503,760

(22) PCT Filed: Jun. 14, 2010

(86) PCT No.: PCT/JP2010/060012
§ 371 (c)(1),
(2), (4) Date: Apr. 24, 2012

(87) PCT Pub. No.: WO2011/158316
PCT Pub. Date: Dec. 22, 2011

(65) Prior Publication Data
US 2012/0206007 A1 Aug. 16, 2012

(51) Int. Cl.
*H02K 21/12* (2006.01)
*H02K 15/02* (2006.01)
*H02K 1/27* (2006.01)

(52) U.S. Cl.
CPC .......... *H02K 1/2766* (2013.01); *Y10T 29/49012* (2015.01)

(58) Field of Classification Search
CPC . H02K 1/2766; H02K 1/276; Y10T 29/49012
USPC ........................ 310/156.53, 156.56
See application file for complete search history.

(56) References Cited

U.S. PATENT DOCUMENTS

| | | | |
|---|---|---|---|
| 6,188,157 B1* | 2/2001 | Tajima et al. | 310/156.53 |
| 7,605,510 B2* | 10/2009 | Okuma et al. | 310/156.53 |
| 2003/0201685 A1 | 10/2003 | Shimada et al. | |
| 2006/0119194 A1* | 6/2006 | Bailey | 310/61 |
| 2007/0126305 A1 | 6/2007 | Okuma et al. | |

(Continued)

FOREIGN PATENT DOCUMENTS

| CN | 1617429 A | 5/2005 |
|---|---|---|
| JP | 9-247908 A | 9/1997 |

(Continued)

OTHER PUBLICATIONS

Translation of foreign document JP 09247908 A (Year 1997).*

(Continued)

*Primary Examiner* — Alex W Mok
(74) *Attorney, Agent, or Firm* — Sughrue Mion, PLLC

(57) ABSTRACT

A cylindrical rotor core 10 for a rotating electrical machine having magnetic steel plates integrally connected by laminating in an axial direction, and having magnet insertion holes 24, 26 formed for inserting permanent magnets inside, wherein the magnet insertion holes 24, 26 are formed extending in the axial direction in a core inner section in the vicinity of an outer peripheral surface 11c of the rotor core 10, and with openings formed in axial direction end sections of the rotor core 10, and a plurality of magnetic steel plates, including magnetic steel plates at outermost sides in the axial direction in which the openings are formed, are fixed by welding at inner wall surfaces 42 of the magnet insertion holes 24, 26.

4 Claims, 7 Drawing Sheets

(56) References Cited

U.S. PATENT DOCUMENTS

| | | | |
|---|---|---|---|
| 2009/0045689 A1* | 2/2009 | Haruno et al. | 310/156.56 |
| 2009/0174273 A1* | 7/2009 | Watanabe et al. | 310/156.53 |
| 2009/0174276 A1* | 7/2009 | Tajima et al. | 310/156.57 |
| 2009/0179516 A1* | 7/2009 | Bailey | 310/211 |
| 2010/0001607 A1 | 1/2010 | Okuma et al. | |
| 2010/0225431 A1 | 9/2010 | Kadota et al. | |

FOREIGN PATENT DOCUMENTS

| | | |
|---|---|---|
| JP | 11-18324 A | 1/1999 |
| JP | 2001-057747 A | 2/2001 |
| JP | 2002-345189 A | 11/2002 |
| JP | 2003-304670 A | 10/2003 |
| JP | 2004-007943 A | 1/2004 |
| JP | 2007-159197 A | 6/2007 |
| JP | 2009-219341 A | 9/2009 |

OTHER PUBLICATIONS

International Search Report of PCT/JP2010/060012 dated Aug. 31, 2010.

* cited by examiner

ROTOR CORE FOR ROTATING ELECTRICAL MACHINE, AND MANUFACTURING METHOD THEREOF

TECHNICAL FIELD

The present invention relates to a rotor core for a rotating electrical machine, and a manufacturing method thereof, and in particular relates to a rotor core for a rotating electrical machine constructed by integrally coupling magnetic steel plates by laminating, and to a manufacturing method thereof.

BACKGROUND ART

Conventionally, a rotating electrical machine (hereafter referred to appropriately as a motor) has been known as an electric motor for converting electrical energy into mechanical force, or an electrical generator for carrying out the opposite conversion. A motor generally comprises a substantially cylindrical stator having coils respectively wound around a plurality of teeth sections that are formed projecting inwards, and a rotor provided capable of rotation inside the stator.

As the rotor, the structure shown in FIG. 7, for example, is known. This rotor 50 comprises a rotor core 52 forming a cylindrical shape, a rotor shaft 54 passing through a center part of the rotor core 52, end plates 56 arranged in contact with both sides of the rotor core 52 with respect to an axial direction of the rotor shaft 54 (and rotor core 52) shown by the arrow X, and a fixing member 58 for fixing the rotor core 54 and the end plates 56 on the rotor shaft 56.

The rotor core 52 is formed by integrally coupling a large number of magnetic steel plates, that have been respectively formed by punching silicon steel plate etc. into a circular shape, by laminating in an axial direction and fastening. Also, a plurality of magnets are formed inside the rotor core 52, close to the outer periphery, by embedding a plurality of permanent magnets 60 at equal locations in the circumferential direction.

The rotor shaft 54 is formed from a round steel bar, with a flange section 55 protruding outward in a radial direction formed on an outer periphery. This flange section is brought into contact with an end plate 56 when the rotor 50 is assembled and functions as a contact section for setting an axial position of the rotor core 52 on the rotor shaft.

The end plate 60 is constructed using a circular plate having substantially the same outer shape as an axial direction end section of the rotor core 52. It is common practice, in the end plate 60, to use as a metal an aluminium plate that is comparatively lightweight, inexpensive and easy to machine. End plates 56 provided on both sides of the rotor core in the axial direction have a function to hold down the rotor core 52 from both sides, a function to correct imbalance of the rotor core, and a function to prevent the permanent magnets 56 from coming away from the rotor core 52 in the axial direction.

A fixing member 58 includes a fastening section 62 formed in a cylindrical shape, and a pressing section 64 projecting from one end portion of the fastening section 62 in a radial direction. The fixing section 58 is fixed on the rotor shaft 54 by fastening the fastening section 62 to the rotor shaft 54 in a state where the rotor core 52 and two end plates 56 are pressed in the direction of the flange section 55 by the pressing section 64. In this way the rotor core 52 becomes fixed to the rotor shaft 54 together with the end plates 56.

The end plate 60 is formed in a disk shape having substantially the same outer shape as an axial direction end section of the rotor core 52, specifically a magnetic steel sheet constituting the rotor core 52. By forming in this way, it is possible for the end plates 60 to cause a pressing force to act on the entire surface of the magnetic steel plate at both ends of the rotor core 52 in the axial direction.

Differing from this, it is conceivable to lower cost by making the end plates of smaller diameter than the rotor core. In this case, since a pressing force in the axial direction does not act on outer peripheral sections of the magnetic steel plates positioned at both ends in the axial direction of the rotor core, as described above, it becomes an essential point to suppress how much outer peripheral sections of the magnetic steel plates open up with warping deformation towards the outside in the axial direction due to reactive magnetic force between adjacent magnetic steel plates.

For example, Japanese patent Laid-open No. 2003-304670 (patent document 1) discloses a manufacturing method of a rotor for a rotating electrical machine having a step of laminating magnetic steel sheets to form a rotor core, a step of welding a surface of a desired region of the magnetic steel sheets so as to distort the desired region and form a non-magnetic region, a step of embedding the magnets in the rotor core. As an example of forming the non-magnetic region (embodiment 2 in the patent document 1), forming a rotor core 22 and then carrying out welding by laser welding across the entire axial direction length of the rotor core 22 at a surface 30 of a region between neighboring corner sections (bridge sections) of magnetic slots 28 is described and illustrated.

CITATION LIST

Patent Literature

Patent Publication 1: JP 2003-304670 A

SUMMARY OF INVENTION

Technical Problem

As disclosed in patent document 1 above, on the outer surface of a rotor core formed by laminating magnetic steel plates, if welding is performed in an axial direction of a rotor core then even if end plates positioned on both axial direction sides of the rotor core are made small in diameter each of the magnetic steel plates are connected by the welding, a problem of outer peripheral parts of the magnetic steel plates at the axial direction end section sides opening out by warping deformation towards axial direction outer ends is solved.

However, with patent document 1, since welding is carried out at a desired region on the outer surface of the rotor core and non-magnetic regions are formed by warping, in a case where weld sections have been formed bulging out from the rotor outer surface outward in the radial direction, more processing man-hours become necessary such as for removing those bulging sections, which causes an increase in manufacturing cost of the rotor core to be greater than the reduction in cost due to making the end plate small in diameter An object of the present invention is to provide a rotor core for a rotating electrical machine, and a manufacturing method thereof, that can effectively prevent opening up of magnetic steel plates that are positioned at end section sides in an axial direction due to warping deformation to an outer side, even if end plates are made small in diameter etc, while suppressing increase in manufacturing cost.

Solution to Problem

A rotor core for a rotating electrical machine of the present invention is a cylindrical rotor core for a rotating electrical machine having magnetic steel plates integrally connected by laminating in an axial direction, and having magnet insertion holes formed for inserting permanent magnets inside, wherein the magnet insertion holes are formed extending in the axial direction of a core inner section in the vicinity of an outer peripheral surface of the rotor core, and with openings formed in axial direction end sections of the rotor core, and a plurality of magnetic steel plates, including outermost magnetic steel plates in the axial direction in which the openings are formed, are fixed by welding at inner wall surfaces of the magnet insertion holes.

A manufacturing method for a rotor core for a rotating electrical machine of the present invention comprises a step of forming a cylindrical rotor core by laminating annular magnetic steel plates in an axial direction and integrally connecting them, a step of fixing by welding a plurality of magnetic steel plates, that include outermost magnetic steel plates in an axial direction and have formed therein the openings of magnet insertion holes which extend in the axial direction in the vicinity of an outer peripheral surface of the rotor core and open at axial end sections of the rotor core, at inner wall surfaces of the magnet insertion holes corresponding to sections where width of the magnetic steel plates between the outer peripheral surface of the rotor core and an inner wall surface of the magnet insertion holes become narrow, or the vicinity thereof, a step of inserting permanent magnets into the magnet insertion holes of the rotor core from the openings, and a step of filling resin material between side surfaces of the permanent magnets and inner wall surfaces of the magnet insertion holes to fix the permanent magnets in the magnet insertion holes.

Advantageous Effects of Invention

According to the rotor core for a rotating electrical machine, and manufacturing method thereof, of the present invention, since a magnetic steel plate positioned at an outermost side in the axial direction of the rotor core and formed with openings of magnet insertion holes, and one or a plurality of steel plates adjacent to this magnetic steel plate are fixed by welding on inner wall surfaces of the magnet insertion holes that have been formed extending in the axial direction at a core inner section adjacent to the outer peripheral surface of the rotor core, it is possible to effectively prevent outer peripheral sections of the magnetic steel plates from opening up due to warping deformation towards the outer side in the axial direction, even if end plates are made smaller in diameter than the rotor core, by connecting outer peripheral sections of a plurality of magnetic steel plates at axial direction end sections by welding. Also, in this case, since welding is carried out not on the outer peripheral surface of the rotor core but on inner wall surfaces of magnet insertion holes formed in the rotor core, there is no need for processing such as removing bulging sections as in the case where welding is carried out on the outer peripheral surface of the rotor core, and thus it is possible to suppress increase in manufacturing cost of the rotor core.

DESCRIPTION OF EMBODIMENTS

Embodiments of the present invention will be described in detail in the following with reference to the attached drawings. In this description specific shapes, materials, numerical values and directions etc. are examples for simplifying understanding of the present invention, and can be appropriately modified in line with intended purpose, objectives, specifications etc.

Also, in the description below the rotor core has been described as being applied to a rotor of a motor, that is a rotating electrical machine, but the rotor can also be applied to a rotor for a rotating electrical machine other than the motor, such as an electrical generator.

Figure 1:
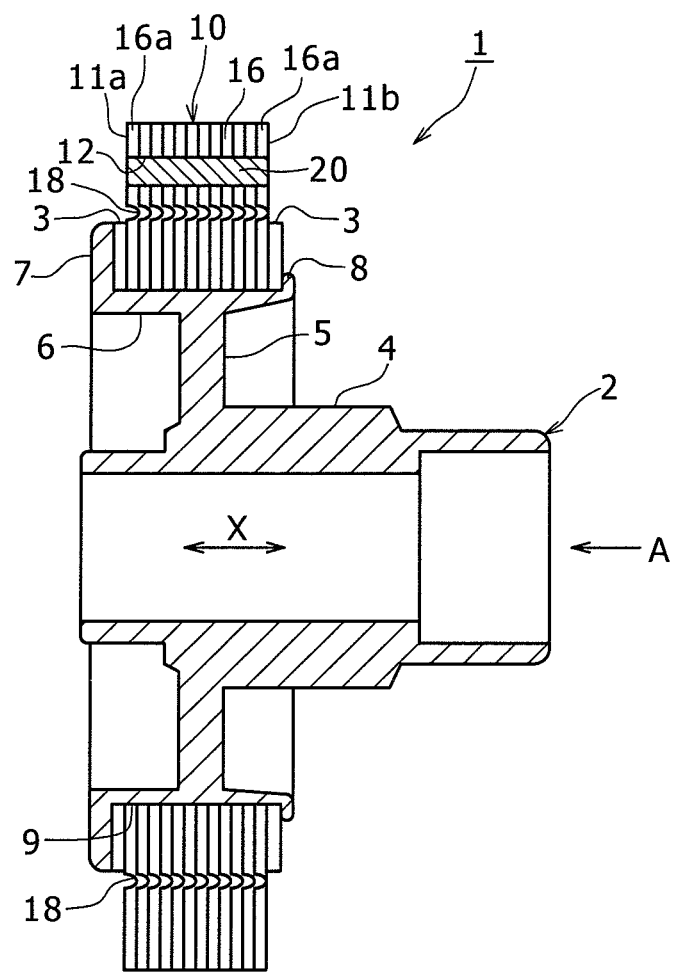
FIG. 1 is a cross sectional drawing along an axial direction showing a rotor that uses a rotor core or a rotating electrical machine of one embodiment of the present invention.

FIG. 1 shows a rotor 1 in which a rotor core 10, which is one embodiment of the present invention, is incorporated. The rotor 1 comprises a rotor shaft 2, the rotor core 10 that is fixed to an outer periphery of the rotor shaft 2, and the end plates 3 respectively arranged in contact with both ends surfaces of the rotor core 10 in an axial direction of the rotor shaft 2 (and rotor core 10) shown by the arrow X.

The rotor shaft 2 is integrally provided with a hollow, stepped cylindrical shaft section 4, a support section 5 that protrudes in a radial direction from an outer periphery of the shaft section 4, and a substantially cylindrical attachment section 6 that is connected to a tip end of the support section 5.

A flange section 7 projects in the radial direction at one end section, in the axial direction, of the attachment section 6, for positioning the rotor core 10 by means of the end plates 3. On the other hand, a hook shaped or flanged fastening section 8 for fastening the rotor core 10 by means of the end plates 3 is integrally formed with the other end section, in the axial direction, of the attachment section 6.

Also, key grooves 9 extending in the axial direction are formed in an outer peripheral surface of the attachment section rotor shaft 2, and by engaging rotor core keys 14 of the rotor core 10 (refer to FIG. 2) that will be described later, revolving of the rotor core 10 with respect to the rotor shaft 2 is regulated.

The end plates 3 are formed of aluminium plates that form a ring, and have an internal diameter substantially corresponding to the outer diameter of the attachment section 6 of the rotor shaft 2, and an outer diameter that is smaller than the rotor core 10. With this embodiment, the end plates 3 have an outer diameter that substantially matches the flange section 7 of the attachment section 6. In this way, it is possible to reduce cost by making the end plates 3 smaller in diameter than the rotor core 10, and also, since the end plates do not have a function to press the plurality of magnetic steel plates that constitute the rotor core 10 in the radial direction at radially outer peripheral sections, it is possible to make the thickness of the end plates thinner than in the related art, which also contributes to cost reduction.

The above-described rotor 1 is assembled as follows. First, an end plate 3 is attached on the outer periphery of the attachment section 6 of the rotor shaft 2 by inserting from the direction of arrow A. Then, the rotor core 10 is similarly equipped on the attachment section 6 of the rotor shaft 2, and is positioned in a state sandwiching the end plates 3 together with the flange section 7.

Following that, after one more end plate 3 has inserted the attachment section 6 of the rotor shaft 2, by bending the fastening section 8 radially outwards while applying a pressing force in the direction of arrow A so that a specified axial direction fixing force acts on the rotor core 10, the rotor core 10 is fastened to the rotor shaft 2 together with the two end plates 3.

The fastening section for fixing the rotor core 10 to the rotor shaft 2 is not limited to being integrally formed with the rotor shaft 2, and can also be constructed as a separate member to the rotor shaft.

Figure 2:
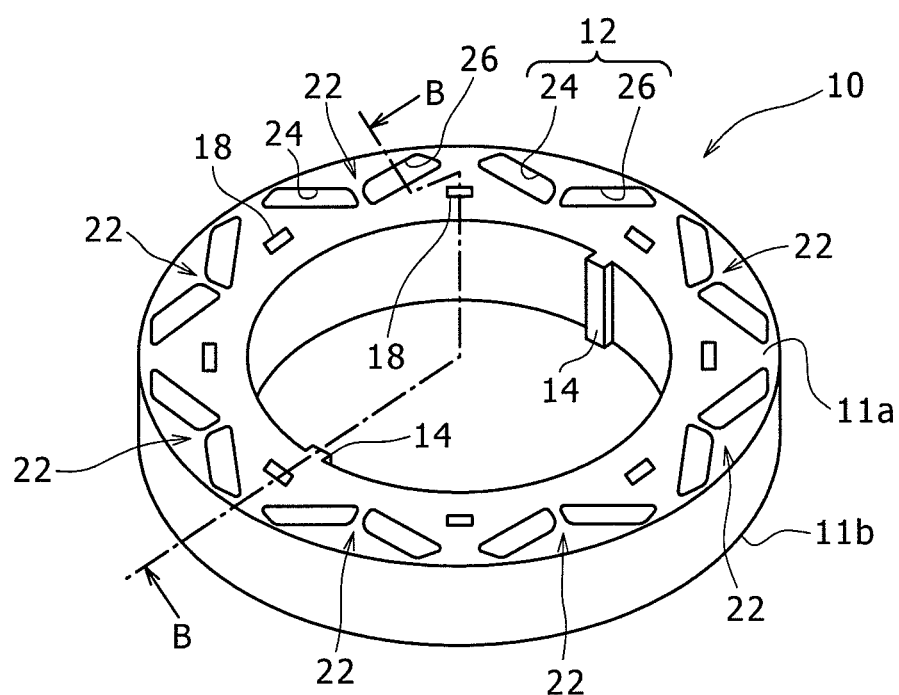
FIG. 2 is a perspective view of the rotor core shown in FIG. 1.
Figure 3:
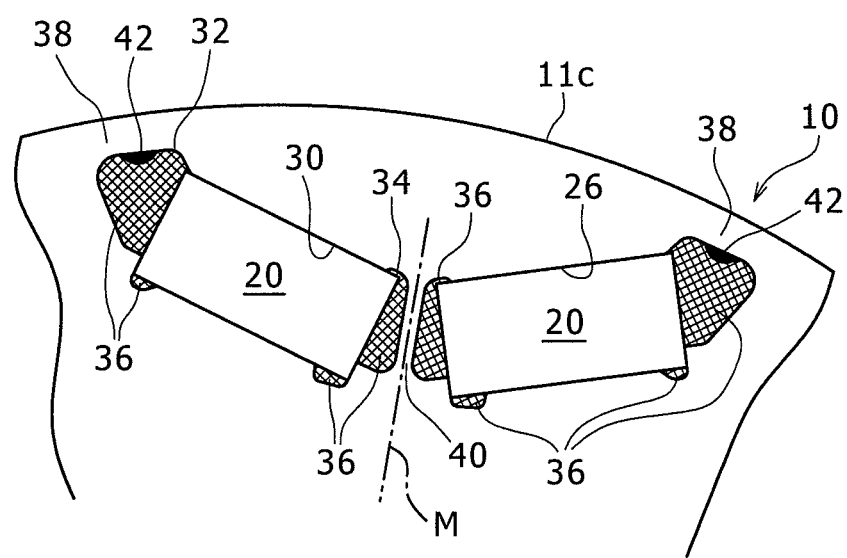
FIG. 3 is an enlarged plan view of a pair of magnet insertion holes formed in the rotor core.

Next, the rotor core 10 will be described in detail with reference to FIG. 2 and FIG. 3 in addition to FIG. 1. FIG. 2 is a perspective drawing of the rotor core 10, and FIG. 3 is an enlarged plan view of a pair of magnet insertion holes 24, 26 formed in the rotor core 10. The rotor core 10 shown in FIG. 1 is equivalent to the cross section along the line B-B in FIG. 2.

As shown in FIG. 1 and FIG. 2, the rotor core 10 forming a cylindrical shape is constructed by laminating a plurality of magnetic steel plates 16, that have been formed by being punched into ring shapes, in the axial direction. Each of the magnetic steel plate 16 are integrally connected to each other by coupling fastening indent sections 18 that have been deformed by being pushed in locally. A plurality (8 in this embodiment) of the fastening indent sections 18 are formed at equal intervals in the circumferential direction. Also, two keys 14 projecting opposite to each other in the radial direction are formed on an inner surface of the rotor core 10, extending in the axial direction.

In the rotor core 10, all of the magnetic steel plates 16 are being shown connected together by the fastening indent sections 18, but this is not limiting, and in a case where there are a lot of magnetic steel plates 16, for example, it is possible to integrally connect sets of plates, that have been connected by caulking etc. for each of a plurality of divided blocks in the axial direction, by adhesion or the like.

A plurality of permanent magnets 20 are embedded in a core inner section in the vicinity of the outer peripheral surface of the rotor core 10, arranged equally in the circumferential direction. In detail, the rotor core 10 has 8 magnetic poles 22 arranged equally in the circumferential direction, and each magnetic pole 22 is constructed using a pair of permanent magnets 20 that have been embedded forming substantially a 'V' shape. The pairs of permanent magnets 20 constituting each magnetic pole 22 respectively have a flat rectangular end surface shape and cross-sectional shape, and have substantially the same length as or a slightly shorter length than the rotor core 10. Also, the pairs of permanent magnets 20 are arranged so that each of facing end sections close to the circumferential direction are respectively slightly offset toward the center of the rotor core 10, so that pairs of permanent magnets 20 spread in a substantially 'V' shape towards the outer peripheral surface of the rotor core 10.

The pairs of permanent magnets 20 are respectively arranged inside pairs of magnet insertion holes 24, 26, that are formed in correspondence with each of the magnetic poles 22. The above described substantially 'V' shaped arrangement of the pair of permanent magnets 20 is realized by the arrangement of these magnet insertion holes 24, 26. The magnet insertion holes 24, 26 are formed extending in the axial direction of the rotor core 10, opening to both ends sections, in the axial direction, of the rotor core 10, and permanent magnets 20 can be inserted into the magnet insertion holes 24, 26 from either of these openings.

FIG. 3 is an expanded plan view of the magnet insertion holes 24, 26 into which permanent magnets 20 are respectively inserted. Magnet insertion holes 24, 26 are formed in mirror symmetrical shapes and positions on both sides of a magnetic pole center line M that runs between them in a radial direction, and so the following description is given for one of the magnet insertion holes 24, and description of the other magnet insertion hole 26 is omitted due to being incorporated herein by reference.

The magnet insertion hole 24 is mainly formed from a magnet housing section 30 in which a permanent magnet 20 having a flat rectangular shaped is inserted and housed, but the magnet insertion hole 24 also includes resin filling holes 32, respectively formed passing through on both sides in the long side direction of the permanent magnet 20. The appearance of a resin material 36 having been filled into the resin filling holes 32, 34 is shown by crosshatching in FIG. 3. The resin material 36 is filled in by injection molding etc. after the permanent magnet 20 has been inserted into the magnet housing section 30, and fulfills a function of fixing the permanent magnet 20 inside the magnet insertion hole 24.

The resin material 36 can be filled into a narrow gap between the side surface of a permanent magnet 20 and an inner wall surface of a magnet housing section 30, or can be filled so as to close up opening sections of the magnet insertion hole 24 that open to the axial direction end section 11a and/or 11b of the rotor core 10.

One resin filling hole 32 is formed extending towards the outer peripheral surface 11c of the rotor core 10, effectively forming a first bridge section 38 where width of the magnetic steel plate 16 between the outer peripheral surface 11c of the rotor core 10 and the inner wall surface of the resin filling hole 32 becomes narrow.

The other resin filling hole 34 is formed extending towards the other magnet insertion hole 26 that makes up the pair, effectively forming a second bridge section 40 where width of the magnetic steel plate 16 between the two magnet insertion holes 24 and 26 becomes narrow.

Figure 4:
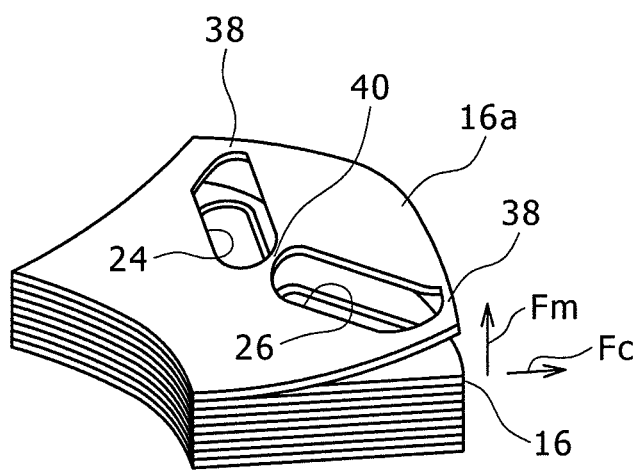
FIG. 4 is an enlarged drawing showing the appearance of a bulging portion formed by warping of an outer peripheral section of a magnetic steel plate positioned at an outermost side in the axial direction of the rotor core.

A rotor 1 is formed by attaching the rotor core 10 that has permanent magnets 20 fixed inside magnet insertion holes 12, as described above, to the rotor shaft 2, and at the time of assembling this rotor 1 in a motor, as shown in FIG. 4, a repulsion force Fm based on a repulsive magnetic force occurs between adjacent magnetic steel plates as a result of magnetic flux passing through from the permanent magnets 20. This repulsion force Fm is not a problem for magnetic steel plates positioned in the center, in the axial direction, of the rotor core 10, but with a plurality of magnetic steel plates 16, 16a, positioned in the axial direction end sections 11a, 11b, of the rotor core 10, particularly the magnetic steel plate 16a that is at the outermost position in the axial direction, an outer peripheral section of the magnetic steel plate 16a is subjected to warping deformation, bending away from an adjacent magnetic steel plate 16, due to the repulsion force Fm. The fact that the end plates 3 have been made smaller in diameter than the rotor core 10 may be the reason why a pressing force does not act on outer peripheral sections of the magnetic steel plates 16.

Conversely, when the rotor 1 of the above described motor is rotatably driven, a centrifugal force Fc comes into play, and each of the magnetic steel plate 16 constituting the rotor core 10 extends along the radial directions resulting in a state where all of the magnetic steel plates 16 are in contact with each other, including the magnetic steel plate 16a that has the above-described deformation corrected.

By being repeatedly subjected to these types of warping deformation and extending deformation, at the plurality of magnetic steel plate 16, including the above described magnetic steel plates 16a that are positioned at the sides 11a, 11b of the rotor core 10, it becomes easy for outer peripheral sections of those steel plates to be damaged by fatigue, and in particular it is easy for damage to occur at the first and second bridge sections 38, 40 where width of the magnetic steel plates 16 becomes narrow and strength is lowered.

With the rotor core 10 of this embodiment therefore, the plurality of magnetic steel plates 16, including the magnetic steel plates 16a positioned at the axial direction end sections 11a, 11b of the rotor core 10, are fixed by welding at inner wall surfaces of the first bridge section 38, specifically at an inner wall surface of the resin filling holes 32 forming part of the magnet insertion hole 24.

Figure 5A:
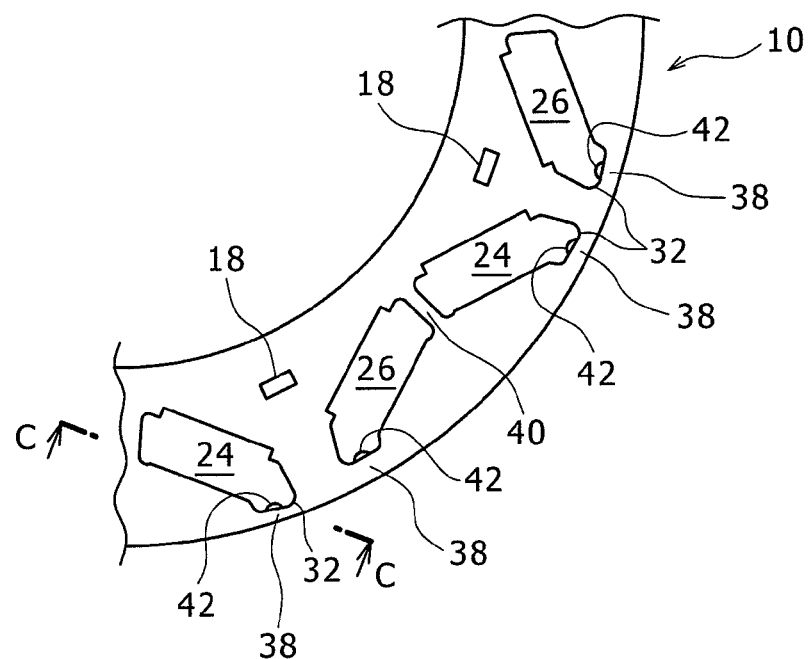
FIG. 5A is a partial plan view of the rotor core.
Figure 5B:
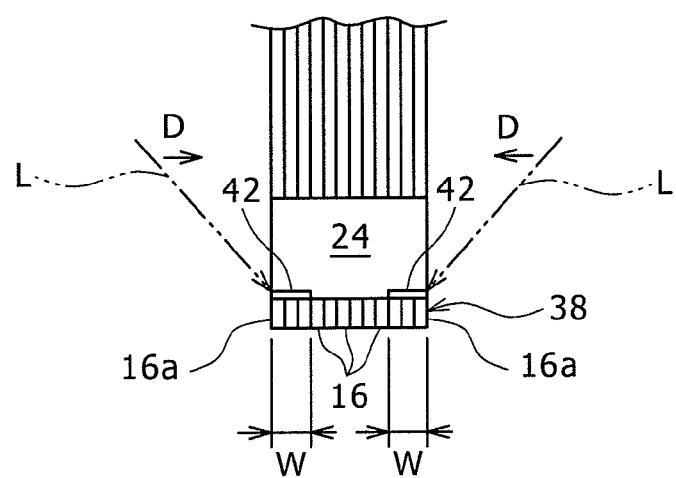
FIG. 5B is a cross sectional drawing along line C-C in FIG. 5A.

As shown in FIG. 5A and FIG. 5B, with the rotor core 10 having magnetic steel plates 16 integrally connected by laminating, before inserting the permanent magnets 20, inner wall surfaces of resin filling holes 32 of magnetic insertion holes 24, 26 are welded by laser welding, for example, to form welded sections 42, and outer peripheral sections of a plurality of magnetic steel plates that are respectively positioned at axial direction end sections 11a, 11b are connected together by the welded sections 42. In this way, by also connecting the plurality of magnetic steel plates 16, including the magnetic steel plates 16a positioned outermost in the axial direction, at outer peripheral sections, strength and rigidity are increased, and as a result it is possible to prevent a state where the magnetic steel plates 16a bend upwards with warping deformation, even if the repulsion force Fm acts. Specifically, it is possible to reliably prevent damage to the first and second bridge sections 38, 40. The welding method is not restricted to laser welding, and it is also possible to use another welding method such as gas welding or electrical welding for example.

In the case where the laser welding is used, it is possible to appropriately set the axial length w of the welded section 42, that is, the number of magnetic steel plates that are connected by welding the first bridge sections 38 together, by adjusting the size of a spot of a laser beam L, or adjusting a distance over which a laser beam L, that is irradiated at an angle in the axial direction, moves in the direction of arrow D (axial direction).

Also, since welding is carried out not on the outer peripheral surface 11c of the rotor core 10 but on inner wall surfaces of resin filling holes 32 of magnet insertion holes 24, 26 formed in the rotor core 10, there is no need for processing such as removing bulging section as in the case where welding is carried out on the outer peripheral surface 11c of the rotor core 10, and it is possible to suppress increase in manufacturing cost of the rotor core 10. Further, even if the welded sections 42 form bulging sections, since they are at the inner wall surface of the resin filling holes 32, there is no interference to insertion of permanent magnets into the magnet insertion holes 24, 26.

Also, since the welded sections 42 correspond to the first bridge section 38, or the vicinity thereof, where width of the magnetic steel plates 16 between the outer surface 11c of the rotor core 10 and the inner wall surface of the magnet insertion holes 24, 26 becomes narrow, it is possible to effectively reinforce the first bridge section 38, which is a section most likely to be damaged, by connection of the plurality of magnetic steel plates by welding.

Also, the welding sections 42 are only provided on both ends 11a, 11b sides of the rotor core 10 in the axial direction. As a result, it is possible to suppress increase in manufacturing cost of the rotor core 10 compared to the case of welding along the entire length in the axial direction of the rotor core 10.

Further, the welded section 42 is a part of the inner wall surface of the resin filling hole 32, and this hole 32, which is filled with resin material 36 for fixing the permanent magnets 20, also functions as a flux leakage suppression section for suppressing flux leakage at long side end sections (specifically the vicinity of the short side section) of the permanent magnets where magnetic permeability becomes low similar to that of empty space. In other words, the first bridge section 38 that faces this resin filling hole 32 is a section where magnetic flux from the permanent magnet 20 does not pass, and a section where there is no effect on the magnetic characteristics of the magnetic steel plates 16, 16a constituting the rotor core 10. Accordingly, the welding section 42 provided on this type of section will not exert any negative influence on the magnetic characteristics of the permanent magnets 20.

Figure 6:
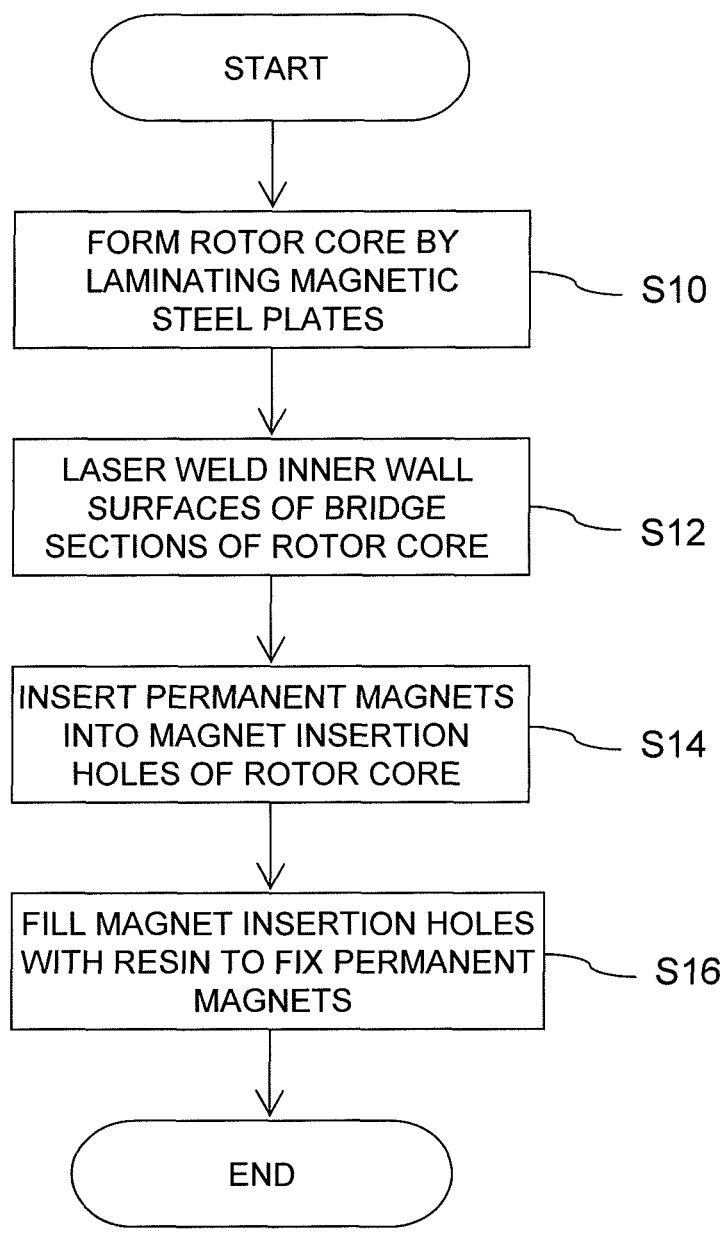
FIG. 6 is a block diagram showing a manufacturing method for a rotor core that is one embodiment of the present invention.
Figure 7:
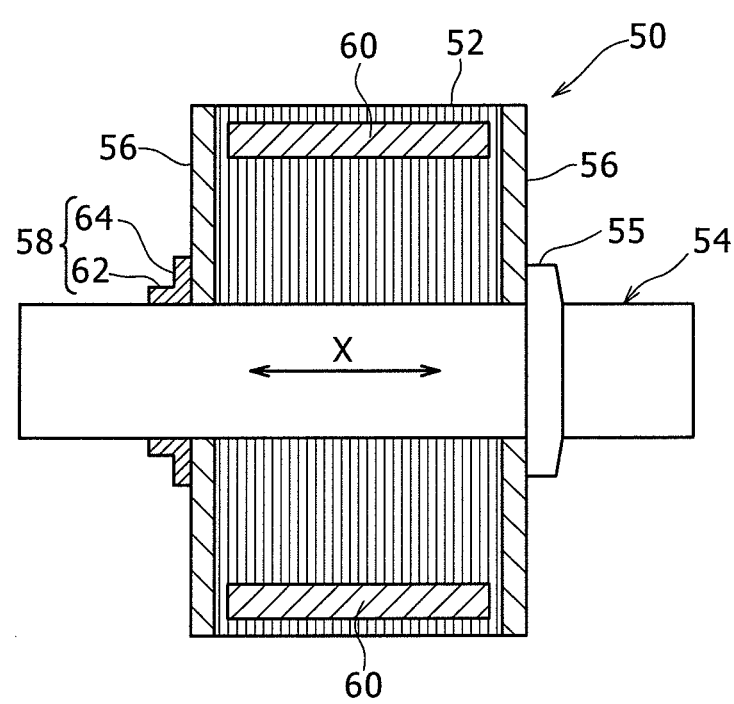
FIG. 7 is a drawing showing a rotor of the related art.

Next, a manufacturing method for the above described rotor core 10 will be simply described with reference to FIG. 6. FIG. 6 is a block diagram showing a manufacturing method for the rotor core 10.

As shown in FIG. 6, first, in step S10, a cylindrical rotor core 10 is formed by laminating magnetic steel plates 16 that have respectively been formed by punch processing and integrally connecting them by caulking and the like.

Next, in step S12, a welded section 42 is formed by laser welding an inner wall surface of a first bridge section 38 of the rotor core 10, and a plurality of magnetic steel plates 16 respectively positioned on the axial direction end sections 11a, 11b sides are connected at outer peripheral sections of the magnet steel plate.

Next, in step S14, permanent magnets 20 are inserted into magnet insertion holes 24, 26 of the rotor core 10.

In step S16 resin material 36 is then filled into the magnet insertion holes 24, 26, and the permanent magnets 20 are fixed. In this way manufacture of the rotor core 10 is completed.

Description has been given above for a case where end plates are made smaller in diameter than the rotor core, but it is also possible to omit one or both of the end plates and to fasten both end sections in the axial direction of the rotor core by directly contacting at least one of a flange section and a fastening section of a rotor shaft.

REFERENCE SIGNS LIST

1 Rotor
2 Rotor shaft
3 End plate
4 Shaft section
5 Support section
6 Attachment section
7 Flange section
8 Fastening section
9 Key groove
10 Rotor core
11a, 11b axial direction end section
11c Outer peripheral surface
12 Magnet insertion hole
14 Key
16, 16a Magnetic steel plate
18 Fastening indent
20 Permanent magnet 22 Magnetic pole
24, 26 pair of magnet insertion holes
30 Magnet housing section
32, 34 Resin filling hole
36 Resin material
38 1st bridge section
40 2nd bridge section
42 Welded section
Fc centrifugal force
Fm Repulsion force
L Laser beam

The invention claimed is:

1. A rotor for a rotating electrical machine comprising:
a cylindrical rotor core formed by laminating magnetic steel plates in an axial direction and integrally connecting them, and having formed therein magnet insertion holes for inserting permanent magnets inside, wherein
the magnet insertion holes are formed extending in the axial direction of a core inner section in the vicinity of an outer peripheral surface of the rotor core, and with openings formed in axial direction end sections of the rotor core, and a plurality of magnetic steel plates, including magnetic steel plates at outermost sides in the axial direction in which the openings are formed, are fixed by laser welding at inner wall surfaces of the magnet insertion holes, and
a welded section of the inner wall surface of the magnet insertion holes is only provided on both end sides in the axial direction of the rotor core, the welded section of the inner wall surface of the magnet insertion holes is a section on an inner wall surface of a resin filling hole that is filled with resin material for magnet fixing after the permanent magnets have been inserted, formed extending to the outer peripheral surface of the rotor core as part of the magnet insertion hole, and, in the laser welding, an axial length of the welded section is set by adjusting the size of a spot of a laser beam, or adjusting a distance over which a laser beam, that is irradiated at an angle to the axial direction, moves in the axial direction of the rotor core;
a plurality of magnets which are inserted and deposited in the magnet insertion holes;
a rotor shaft which the rotor core is fixed to the outer periphery thereof; and
at least one end plate arranged in contact with at least one of the end surfaces of the rotor core in an axial direction,
wherein the end plate is made smaller in diameter than the radial positions of the magnets embedded in the rotor core so that the end plate does not act on the outer peripheral section of the magnetic steel plates which construct the rotor core.

2. The rotor for a rotating electrical machine according to claim 1, wherein
the welded section of the inner wall surface of the magnet insertion holes corresponds to a section, or a vicinity thereof, where width of the magnetic steel plates between the outer peripheral surface of the rotor core and the inner wall surface of the magnet insertion holes becomes narrow.

3. The rotor for a rotating electrical machine according to claim 1, wherein
the welded section of the inner wall surface of the magnet insertion holes is a section that does not have an effect on the magnetic characteristics of the magnetic steel plates constituting the rotor core.

4. The rotor for a rotating electrical machine according to claim 1, wherein
the resin filling hole functions as a flux leakage restrictions section for restricting flux leakage that occurs at end sections of the permanent magnets.

\* \* \* \* \*